United States Patent [19]

Ishikawa

[11] 4,178,984
[45] Dec. 18, 1979

[54] APPARATUS FOR SUPPLYING INSERTS TO THE METAL MOLD OF INJECTION MOLDING MACHINES

[75] Inventor: Tatsuo Ishikawa, Ube, Japan
[73] Assignee: Ube Industries, Japan
[21] Appl. No.: 922,293
[22] Filed: Jul. 6, 1978
[51] Int. Cl.² .................. B22D 17/24; B22D 17/32
[52] U.S. Cl. ........................... 164/333; 164/154; 414/736; 198/566
[58] Field of Search ............ 164/333, 332, 108, 112, 164/154; 441/736, 741

[56] References Cited

U.S. PATENT DOCUMENTS

| | | | |
|---|---|---|---|
| 1,645,167 | 10/1927 | Theobald et al. | 164/332 X |
| 2,886,867 | 5/1959 | Peterson et al. | 164/112 X |
| 3,608,622 | 9/1971 | Bachelier | 164/333 X |
| 4,110,894 | 9/1978 | Zuev et al. | 164/112 X |

FOREIGN PATENT DOCUMENTS

| | | | |
|---|---|---|---|
| 44-16007 | 7/1969 | Japan | 164/112 |
| 821014 | 9/1959 | United Kingdom | 164/332 |

Primary Examiner—Robert D. Baldwin
Assistant Examiner—J. Reed Batten, Jr.
Attorney, Agent, or Firm—Blakely, Sokoloff, Taylor & Zafman

[57] ABSTRACT

An inverted U-shaped frame is provided to straddle the injection molding machine, and a chain conveyor provided with spaced apart groups of L-shaped insert carriers is moved along the frame. An insert chute is provided for working side of the frame for loading cylindrical inserts on the carriers. An insert transfer device is provided on the other side of the frame for transferring the inserts from the chain conveyor to an insert holder which is swung between the insert transfer device and the metal mold. The holder holds the inserts in a pattern corresponding to the pattern of the inserts when they are disposed in the metal mold. The chain conveyor is moved intermittently at a predetermined feed pitch. An insert detector is provided near the chute and when the detector detects that an insert carrier is not loaded with an insert, the direction of movement is reversed to return the empty insert carrier to the chute to load an insert thereon.

6 Claims, 13 Drawing Figures

APPARATUS FOR SUPPLYING INSERTS TO THE METAL MOLD OF INJECTION MOLDING MACHINES

BACKGROUND OF THE INVENTION

This invention relates to apparatus for supplying inserts to the metal mold of such an injection molding machine as a die cast machine.

When molding a casing of an internal combustion engine, for example, by injection molding, it is necessary to supply bearings and bosses which are to be integrally cast and generally take the form of cylindrical bodies, called "inserts", into predetermined positions of a metal mold. Such apparatus is called insert supply apparatus.

Various peripheral apparatus, for example, a product take-out device, a lubricant sprayer, etc. are installed about an injection molding machine so that it is difficult to neatly arrange the insert supply apparatus which is relatively bulky. Thus, when the insert supply apparatus is installed in front or on working side of the molding machine, it interferes with the operations of the other devices. Accordingly, it is advantageous to install the insert supply apparatus on the rear side of the injection molding machine, especially when one operator attends two or three injection molding machines.

Generally, it is necessary to convey a group of inserts and to insert them into a metal mold at a correct pattern. As a consequence, it is necessary to arrange in an accurate pattern a plurality of inserts which have been conveyed to the metal mold by a conveyor. When arranging the inserts in an accurate pattern, it is necessary to arrange the cylindrical inserts by taking the inside diameter thereof as a reference and then transfer them to the insert supply apparatus.

In the operation of the insert supply apparatus of the type referred to above, the inserts are conveyed intermittently by a conveyor in synchronism with the operation of the injection molding machine. In a prior art insert supply apparatus, the conveyor has been intermittently moved by an electric motor. However, it is difficult to accurately start and stop the driving motor unless complicated and expensive motor control system is used.

It is also necessary to supply a plurality of inserts to the conveyor, to intermittently convey them and to accurately transfer them from the conveyor to the insert supply apparatus.

Further, it is necessary that all insert carriers carried by the conveyor should be loaded with inserts at a loading station.

SUMMARY OF THE INVENTION

Accordingly, it is an object of this invention to provide an improved insert supply apparatus utilized in an injection molding machine which does not interfere with the operation of the injection machine and its peripheral apparatus.

Another object of this invention is to provide an insert supply apparatus for an injection molding machine which can arrange a plurality of inserts conveyed by a conveyor in an accurate pattern suitable for insertion into a metal mold of the injection molding machine.

Still another object of this invention is to provide an improved insert supply apparatus having a relatively simple construction so that it can be readily manufactured, assembled and operated, thereby enabling one operator to attend two or more insert supply apparatus.

Yet another object of this invention is to provide an improved insert supply apparatus capable of operating intermittently at a feed pitch corresponding to the number of inserts concurrently inserted into a metal mold.

A further object of this invention is to provide an improved insert supply apparatus of an injection molding machine capable of rapidly and accurately transferring a plurality of inserts onto an insert receiving device and capable of mounting a plurality of inserts on a plurality of insert carriers carried by a conveyor through a supply chute.

Still further object of this invention is to provide apparatus for correctly supplying inserts to insert carriers mounted on a chain conveyor.

Another object of this invention is to provide a driving device of a chain conveyor which conveys inserts, which can drive intermittently the chain conveyor at a feed pitch corresponding to the number of inserts to be supplied simultaneously into the metal mold of an injection molding machine.

According to this invention, there is provided apparatus for supplying inserts to a metal mold of an injection molding machine comprising an inverted U-shaped frame which straddles the injection molding machine, a chain conveyor extending along the frame, drive means for intermittently driving the chain conveyor, means provided on working side of the frame for supplying the inserts to the chain conveyor, means provided on the opposite side of the frame for transferring the inserts to insert holding means from the chain conveyor and means for mounting the inserts transferred to the insert holding means into the metal mold.

According to a preferred embodiment of this invention, the chain conveyor is provided with a plurality of L-shaped insert carriers which are grouped into a plurality of groups and spaced a predetermined pitch along the chain conveyor. The inserts are loaded on the carriers through a chute provided on working side of the U-shaped frame. In the chute are provided a plurality of inclined plates of the number equal to the number of the insert carriers of each group. Cylindrical inserts supported on the inclined plates roll thereon onto the L-shaped insert carriers. The means for transferring the inserts to an insert holder from the chain conveyor includes a plurality of insert receiving rods which are disposed in a predetermined pattern corresponding to that of the inserts when they are disposed in the metal mold and means for simultaneously moving the insert receiving rods into the openings of cylindrical inserts.

The insert holder comprises a receiving plate and a clamping plate which are provided with opposing semicircular recesses for clamping therebetween the cylindrical inserts.

The chain conveyor comprises a number of sprocket wheels and one of them is driven by an electric motor through an endless chain. A feed dog rotatable in one direction but not in the opposite direction is disposed to engage the endless chain and reciprocated in parallel with one straight run of the endless chain so as to intermittently drive the chain conveyor at a predetermined feed pitch.

Near the insert supply chute is disposed an insert detecting means responsive to the presence or absence of an insert on the insert carrier. When the detecting means detects that an insert carrier does not contain any insert, the movement of the chain conveyor is reversed to return the empty insert carrier to the chute for loading thereon an insert.

BRIEF DESCRIPTION OF THE DRAWINGS

Further objects of the invention can be more fully understood from the following detailed description taken in conjunction with the accompanying drawings in which.

DESCRIPTION OF THE PREFERRED EMBODIMENT

Figures 1A, 1B:
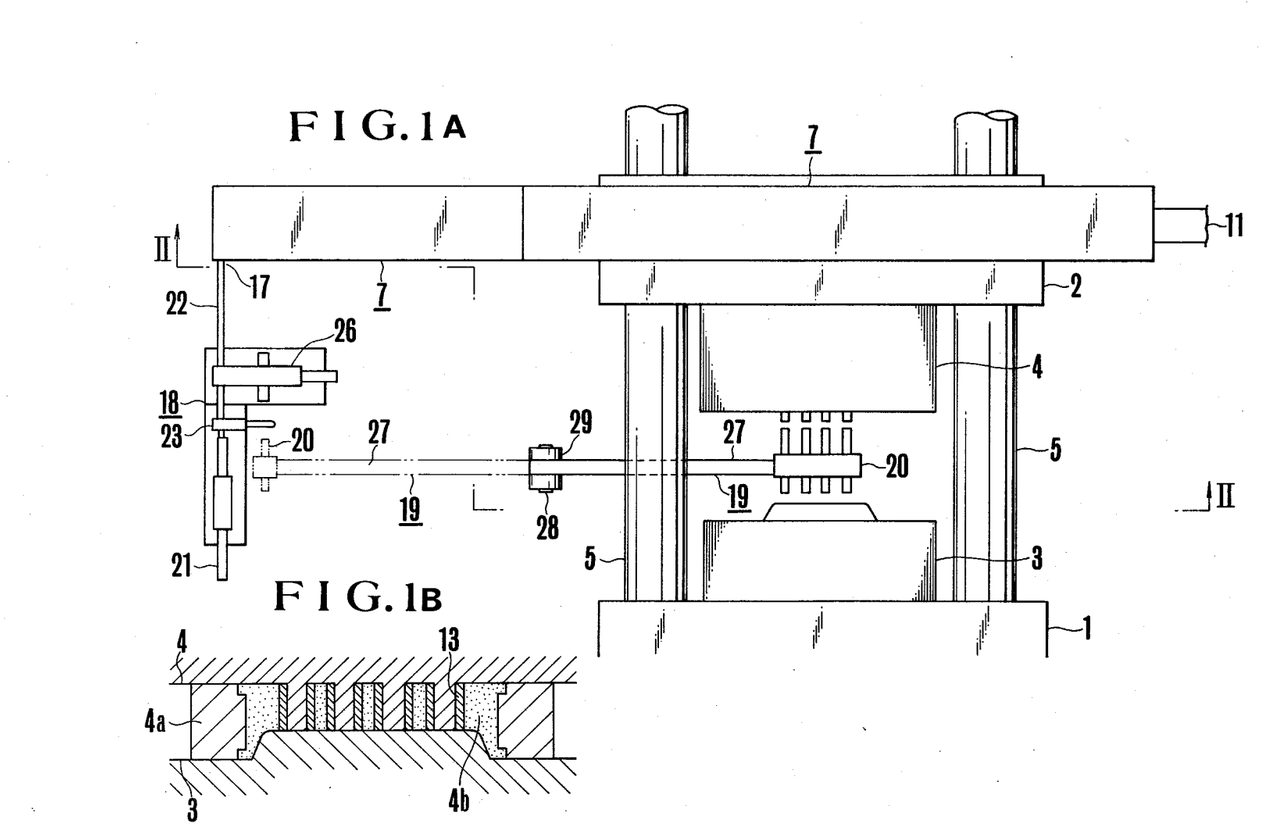
FIG. 1A is a plan view showing one embodiment of the insert supply apparatus of this invention and an injection molding machine utilizing the insert supply apparatus.
FIG. 1B is a fragmentary sectional view of a metal mold.
Figures 2, 3:
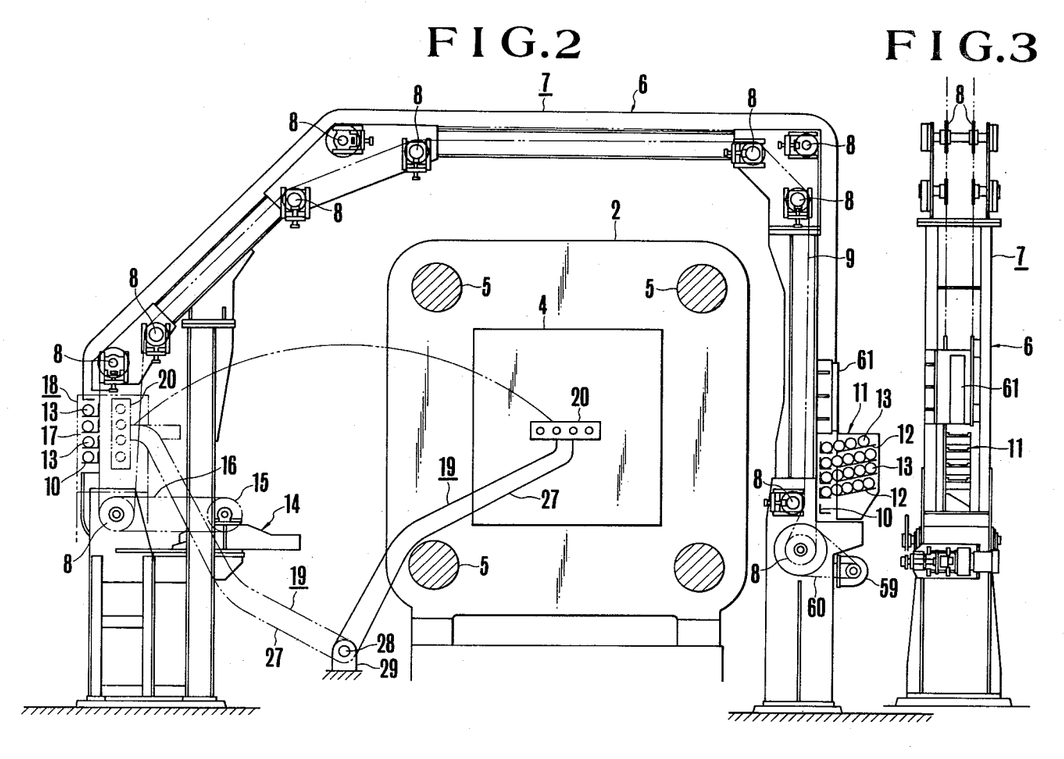
FIG. 2 is a front view taken along line II—II in FIG. 1A showing the relative location of the injection molding machine to the insert supply apparatus.
FIG. 3 is a righthand side view of the insert supply apparatus.

Referring now to FIGS. 1A and 2, the injection molding machine shown therein comprises a stationary platen 1, a movable platen 2, a stationary metal mold half 3 mounted on the stationary platen 1, a movable metal mold half 4 carried by the movable platen 2, and tie rods 5 for guiding the movable platen 2.

An insert supply apparatus 7 of this invention comprises an inverted U-shaped frame 6 straddling the injection molding machine. The righthand side as viewed in FIGS. 1A and 2 is termed the working side of the machine. Sprocket wheels 8 are rotatably mounted on the lower portion of the opposite legs of the frame 6 and at bent portions thereof to support an endless chain of a chain conveyor 9. As shown, a group of L-shaped insert carriers 10 is secured to the chain conveyor 9 with a predetermined spacing between adjacent insert carrier groups.

An insert supply chute 11 is provided on the righthand or working side of the frame 6. As shown in FIGS. 2 and 3, the insert supply chute 11 takes the form of a box containing a plurality of inclined guide plates 12 for sequentially supplying the inserts to the insert carriers. The inserts 13 supplied by the chute 11 are intermittently transferred to the opposite side or to the lefthand side of the machine by the chain conveyor 9. The chain conveyor 9 is driven by a driving device 14 mounted on the lefthand side of the frame 6. Thus, an electric motor 15 is coupled to the sprocket wheel 8 on the lefthand side through a chain 16 for intermittently driving the chain conveyor with a predetermined feed pitch as will be described later in more detail.

The inserts 13 conveyed by the chain conveyor 9 are inserted into the movable metal mold half 4 in a manner to be described hereunder through an insert transfer device 18 associated with an insert take-out opening 17 and an insert mounting device 19 which receives the inserts from the insert transfer device 18.

The insert transfer device 18 receives the inserts 13 through the insert take-out opening 17 and then transfers the inserts to an insert holder 20 of the insert mounting device 19 which is maintained at a position shown in phantom lines in FIGS. 1A and 2.

The insert transfer device 18 comprises a striker, not shown, and an insert holding member 23 which are mounted on the outer end of the piston rod 22 of a piston-cylinder assembly 21, and an insert moving device 26 which transfers the inserts from the insert holding member 23 to the insert transfer position.

The purpose of the insert mounting device 19 is to mount the inserts 13 received from the insert transfer device 18 in the movable metal mold half 4. The insert mounting device 19 is moved between positions shown by phantom lines and solid lines in FIGS. 1A and 2 and comprises an arm 27 provided with the insert holder 20 at its upper end. The lower end of the arm 27 is secured to a shaft 28 which is journalled by a bearing pedestal 29 and swung by a driving device, not shown. A metal mold realized, for example, for an automobile engine cylinder block comprises, as shown partly in FIG. 1B, a stationary metal mold half 3 having a relatively large diameter projection and a movable metal mold half 4 having a plurality of embossments (four in the figure). The four inserts 13 carried on the insert holder 20 in an intended pattern are transferred from the holder 20 to the corresponding embossments of the movable metal mold half 4. When these mold halves are mated, casting material 4b such as aluminum teemed in a space defined by the mold halves and cores 4a is cast together with four inserts 13. An example of insert 13 is made of cast iron and has a constructional dimension including an outer diameter of 78 mm, an inner diameter of 70 mm and a length of 130 mm.

As described above, the insert supply apparatus comprises an inverted U-shaped frame which straddles the injection molding machine and the inserts supplied on working side of the frame are conveyed to the other side by a conveyor so that the insert supply apparatus does not interfere with the operations of the injection molding machine and peripheral apparatus thereof. Moreover, as the construction of the insert supply apparatus is relatively simple, it is possible to readily manufacture, install and operate the apparatus. Consequently, a single operator can attend two or more insert supply apparatus.

An electric motor 59 is mounted beneath the insert supply chute 11 for driving a sprocket wheel 8 near the lower end of the righthand leg of the U-shaped frame 6 through a chain 60. A detector 61 is provided near the supply chute 11 to detect the fact whether cylindrical inserts have been correctly mounted on the insert carriers 10 or not. When the detector 61 detects that no insert is carried by the carriers 10, motor 59 is started to drive the chain conveyor 9 in the reverse direction for supplying the inserts onto the carriers through the supply chute 11.

As shown in FIGS. 4 through 8, the insert transfer device 18 is provided for the frame 6 on the lefthand leg of the frame 6. The transfer device 18 comprises a supporting frame 73 for supporting a holding plate 75 driven by a piston-cylinder assembly 74 which is disposed to extend through a guide box 76 mounted on the supporting frame 73. One end of the cylinder of the piston-cylinder assembly 74 is secured to a guide frame 77 secured to the upper surface of the supporting frame 73, whereas the other end is secured to an arm projecting to one side of the guide box 76.

The supporting plate 75 is secured to the outer end of the piston rod 79 of the piston-cylinder assembly 74 and the upper and lower ends of the supporting plate 75 are connected to ends of guide rods 80 with their other ends slidably received in guide bushings 81 to protrude into the guide box 76.

A plurality of vertically spaced apart insert receiving rods 75a are secured to the side surface of the holding plate 75 so as to confront ends of inserts 13 carried on insert carriers 10 which are on their vertical movement so that when the holding plate 75 is actuated by the piston-cylinder assembly 74, respective receiving rods 75a are moved horizontally to receive inserts 13. The pattern of arrangement of the insert receiving rods 75a is made equal to the ultimate pattern of arrangement of the inserts 13 when they are inserted into the movable metal mold half 4.

Figure 6:
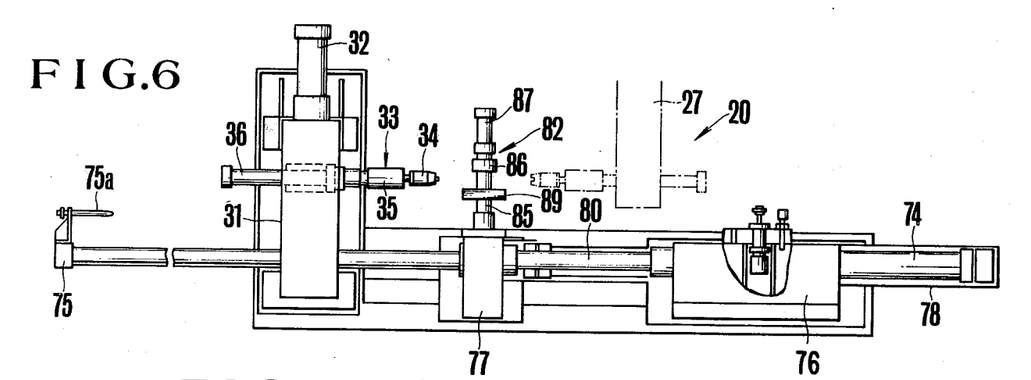
FIG. 6 is a plan view of the insert transfer device shown in FIG. 4.
Figure 7:
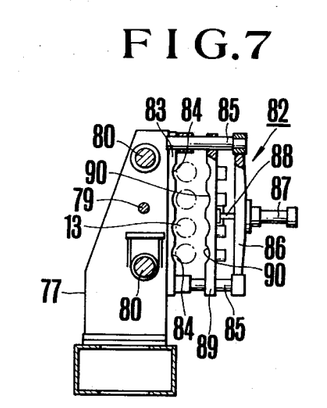
FIG. 7 is a sectional view taken along line VII—VII shown in FIG. 4.

As shown in FIGS. 6 and 7 an insert holder structure 82 is secured to one side of the guide frame 77. As shown in FIG. 7, the holder 82 comprises a receiving plate 83 formed with a plurality of semicircular recesses 84 (in this example, 4) upper and lower guide rods 85 secured to one side of the guide frame 77, a piston-cylinder assembly 87 supported by the guide rods 85 through a plate 86 and a clamping plate 89 slidably guided by the guide rods 85 and operated by the piston rod 88 of the piston-cylinder assembly 87. On the side of the clamping plate 89 facing the receiving plate 83 are formed semicircular recesses 90 to oppose the recesses 84 of the receiving plate 83, whereby when the plates 83 and 89 are mated together, four circular openings are formed having substantially the same diameter as the outer diameter of the inserts.

Secured to the side of the frame 73 is a support frame 31. A piston-cylinder assembly 32 lies in the support frame 31 as shown in FIG. 6, having a slidable piston rod (not shown) having mounted on the end thereof double piston assembly 36 for driving insert receivers 33 in parallel with the guide rods 80.

Figure 8A:
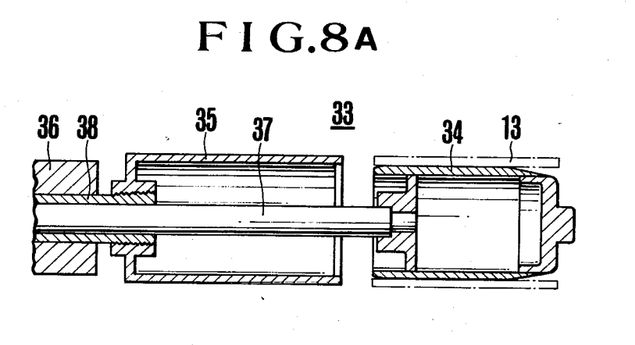
FIG. 8A is a longitudinal sectional view showing an insert receiver.
Figure 8B:
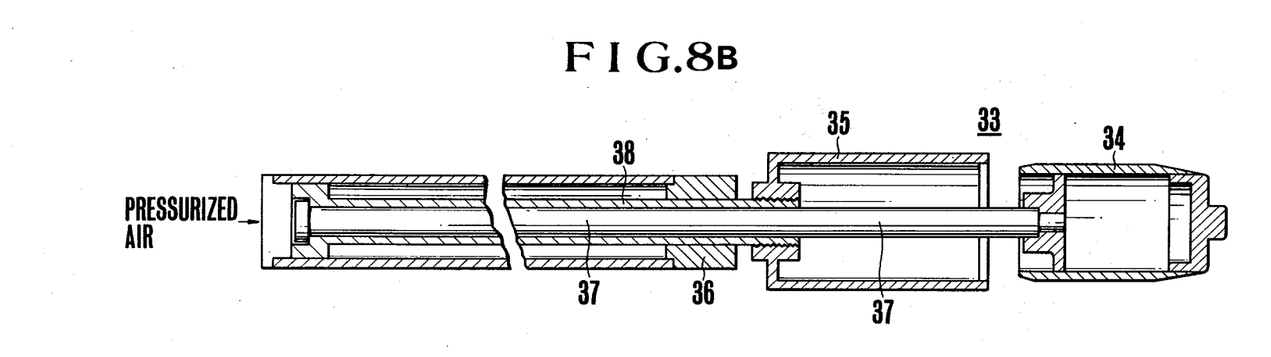
FIG. 8B is a longitudinal sectional view of a double-piston assembly.

The insert receiver 33 of a double cylinder construction comprises an insert receiving member having an outer diameter enough to be snugly received in the inner opening of each insert 13 and an insert push-out member 35 which are driven by a double-piston assembly 36. The insert receiving member 34 and the insert push-out member 35 are coaxially disposed and as shown in FIG. 8A, the outer diameter of the insert receiving member 34 is substantially the same as the inner diameter of the insert push-out member 35 so that the former can be slidably received in the latter. The insert receiving member 34 is secured to the outer end of the inner piston rod 37 whereas the insert push-out member 35 is mounted on the outer end of the outer cylindrical piston rod 38. FIG. 8B shows an illustration of an example of double-piston assembly 36. By pressurized air fed in arrow direction, the piston rod 37 and the outer cylindrical piston rod 38 are advance simultaneously. The leading insert receiving member 34 (male) is moved until it engages the insert holder 20 (female) as will be described later. After the insert receiving member 34 makes engagement with the insert holder 20 and stops, the lagging insert push-out member 35 engages one end of the cylindrical insert 13 carried on the member 34 and then pushes and transfers the insert 13 to the insert holder 20.

Figure 4:
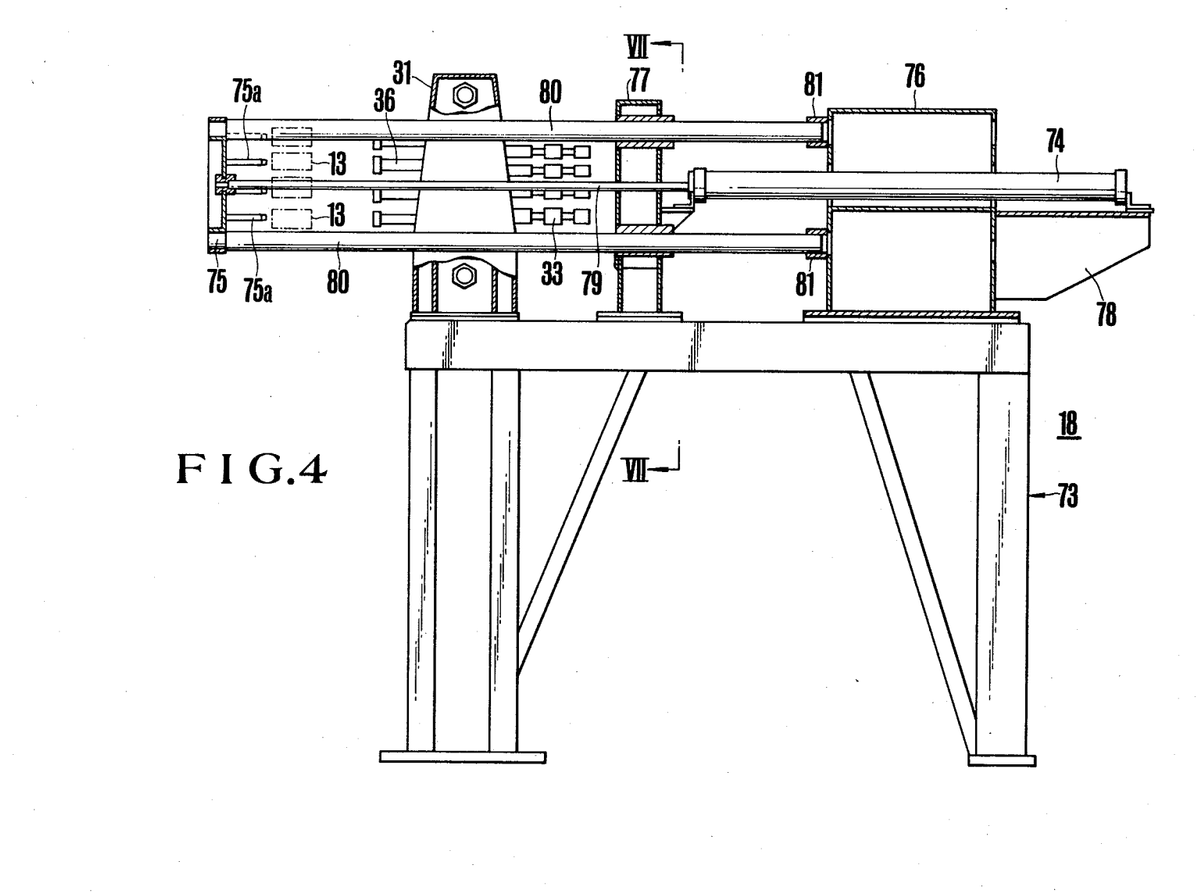
FIG. 4 is a front view of the insert transfer device.
Figure 5:
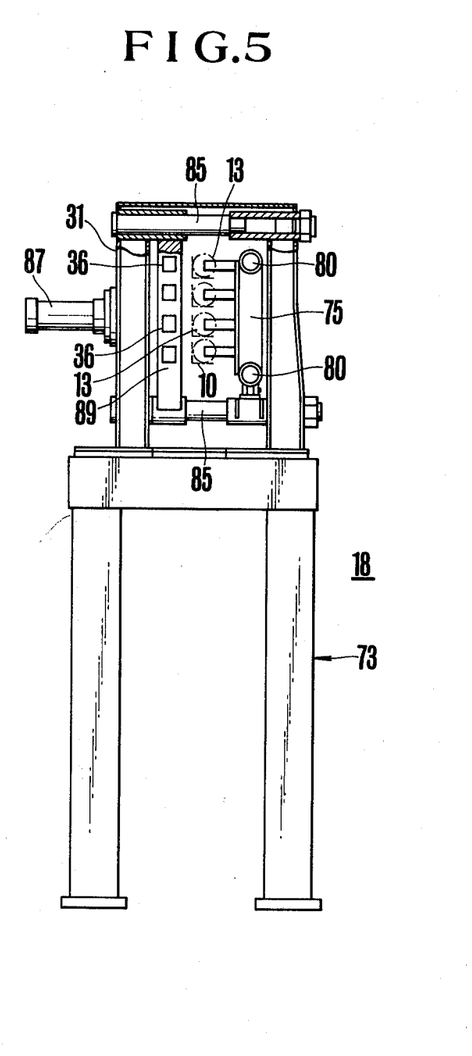
FIG. 5 is a lefthand side view of the insert transfer device shown in FIG. 4.

The insert transfer device 18 described above operates as follows:

A group of four inserts supported by the L-shaped insert carriers 10 of the chain conveyor is intermittently conveyed to positions shown by phantom lines in FIGS. 4 and 5 to oppose respective insert receiving rods 75a. Then, the piston-cylinder assembly 74 is actuated to pull the holding plate 75 towards the piston-cylinder assembly whereby the insert receiving rods 75a are received by respective cylindrical inserts 13.

The free end of each insert receiving rod 75a is bevelled and the insert receiving rods are secured with a suitable spacing or pitch to be consistent with the standard diameter of the inserts 13. When the insert receiving rods 75a are inserted into the openings of the inserts which are freely mounted on the insert carriers 10, the inserts 13 are held by the insert receiving rods in the predetermined pattern.

After supporting the inserts in the predetermined pattern, the insert receiving rods 75a are moved away from the insert carriers 10 to a position between the receiving plate 83 and the clamping plate 89. Then, the piston-cylinder assembly 87 is actuated to move the clamping plate 89 for clamping the inserts 13 thereby aligning them according to their outer diameters.

When the insert receiving rods 75a are returned to their original positions by the operation of the piston-cylinder assembly 74, the piston-cylinder assembly 32 is actuated to move the insert receiver 33 until the axes of the insert receiving members 34 come into alignment with the axes of the inserts 13 held by the insert holder 82.

Then, while the insert receiving members 34 of the insert receiver 33 are maintained in a condition in which they project from the insert push-out members 35, the double cylinder of double-piston assembly 36 is operated to move forwardly the insert receiving members 34 and the insert push-out members 35 until the insert receiving members 34 are inserted into the cylindrical insert 13. Thereafter, the piston-cylinder assembly 87 is operated in the opposite direction to retract the clamping plate 89 for releasing the inserts. Then, by the operation of the double cylinders of double-piston assembly 36, the insert receivers 33 carrying the inserts on their member 34 are retracted and then brought to their original positions by the operation of the piston-cylinder assembly. Thereafter, the insert receivers 33 are advanced by the operation of the double cylinders of piston assembly 36 to a position confronting insert holder 20 (illustrated in phantom lines in FIG. 6) having substantially the same construction as the insert receivers. Then, the insert push-out members 35 are operated to push the inserts 13 towards the insert holder 20 which in turn disposes the inserts at the predetermined positions in the metal mold half 4. Thus, one cycle of the operation is completed and various elements are returned to their original positions to prepare for the next cycle.

As described above, according to this invention, a plurality of inserts which are conveyed by a chain conveyor at a constant feed pitch are received and aligned by a plurality of insert receiving rods which are arranged at a predetermined pattern based on the inner diameter of the inserts so that it is possible to readily and accurately dispose the inserts in the metal mold half in the desired pattern.

Figure 9:
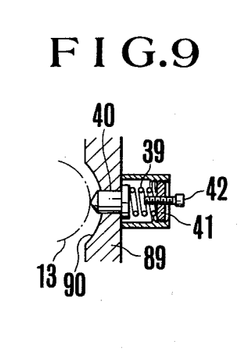
FIG. 9 is a partial sectional view showing the detail of the insert clamping plate.

FIG. 9 shows the detail of the insert clamping plate 89. As shown, a horizontal pin 40 urged by a compression spring 39 extends through the clamping plate 89 to project into the semicircular recess 90 so as to clamp the insert 13 between the pointed end of the pin 40 and the semicircular recess 84 of the receiving plate 83. One end of the compression spring 39 is received by a spring seat 41 which is adjusted by an adjusting bolt 42.

Figure 10:
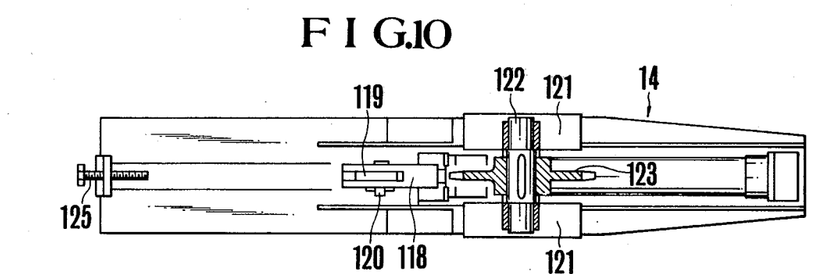
FIG. 10 is a plan view of the driving device of the chain conveyor.
Figure 11:
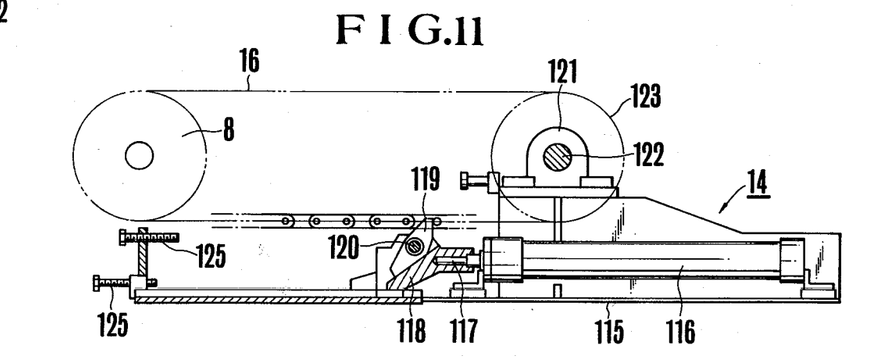
FIG. 11 is a side view of the driving device shown in FIG. 10.

The driving device 14 for driving the chain conveyor at a constant feed pitch is shown in FIGS. 10 and 11. As shown, the driving device 14 comprises a horizontal supporting plate 115 and a piston-cylinder assembly 116 mounted on the supporting plate 115. A bifurcate member 118 is screwed onto the outer end of the piston rod 117 of the piston-cylinder assembly 116 and a feed pawl 119 usually called a dog is pivotally connected to the bifurcate member 118 through a pivot pin 120. The feed pawl 119 is normally biased in the counterclockwise direction by a spring, not shown, or under its own weight, and the counterclockwise rotation of the pawl is limited when its lower side comes to engage the upper side of the bifurcate member 118.

A rotary shaft 122 is journalled by a pair of brackets 121 secured to the opposite side edges of the supporting plate 115, and a sprocket wheel 123 is mounted on the shaft 122. The chain 16 shown in FIG. 1 passes around the sprocket wheel 123 and the sprocket wheel 8 near the lower end of the lefthand side of the frame 6. As diagrammatically shown in FIG. 11, the end of the feed pawl 119 is received between the links of the chain 16.

Stop members 125 are mounted on one end of the supporting plate 115 for limiting the movement of the feed pawl 119, that is, the feed pitch of the chain 16. These stop members are in the form of screws so as to adjust the extent of their protrusion toward the feed pawl 119.

The driving device described above operates as follows. Thus, before the inserts are mounted on the insert carriers 10, the piston-cylinder assembly 116 of the driving device is operated to move the feed pawl 119 until it engages stop members 125. The stroke of the piston and hence the feed pawl 119 at this time corresponds to four insert carriers 10. Since the feed pawl can rotate freely in the clockwise direction, it is advanced while rotated in the clockwise direction by the pins interconnecting the links of the chain 16, and held stationary at a predetermined position. Accordingly, when the piston-cylinder assembly 116 is operated to retract the piston rod 117, since the feed pawl 119 is prevented from rotating in the counterclockwise direction, the chain 16 will be driven in the counterclockwise direction as the feed pawl is retracted. Consequently, the sprocket wheel 8 adapted to drive the chain conveyor 9 is rotated over a peripheral length corresponding to four insert carriers 10.

When the insert carrier 10 supplied with an insert is moved upwardly along the righthand leg of the frame 6, the detector 61 detects whether the insert carrier is containing the insert or not. The presence or absence of an insert on the insert carrier may be detected by a detector of any well known type, for example, those utilizing a photoelectric cell, an inductor whose inductance varies in accordance with the presence or absence of the insert or an electromagnetic device. When the fact is detected that the insert carrier does not contain any insert, the piston-cylinder assembly 116 is deenergized and the motor 59 is started to reverse the rotation of the sprocket wheel 8 through chain 60. As the chain conveyor 9 is moved in the opposite direction toward the chute 11, an insert will roll into the empty insert carrier 10. Thereafter, the chain conveyor 9 is driven again in the normal direction. Thus, the inserts are conveyed intermittently to the insert transfer device 18.

As described above, the driving device of this invention intermittently drives the chain conveyor at a feed pitch corresponding to the number of inserts which are to be supplied simultaneously into the metal mold of the injection molding machine.

What is claimed is:

1. Apparatus for supplying inserts to a metal mold of an injection molding machine comprising an inverted U-shaped frame which straddles said injection molding machine, a chain conveyor extending along said frame, drive means for intermittently driving said chain conveyor, means provided on working side of said frame for supplying the inserts to said chain conveyor, means provided on the opposite side of said frame for transferring the inserts to insert holding means from said chain conveyor, and means for mounting the inserts transferred to said insert holding means into said metal mold, wherein said chain conveyor is provided with a plurality of L-shaped insert carriers, and said insert supply means comprises a chute containing a plurality of inclined plates on which cylindrical inserts roll into said insert carriers, wherein a predetermined number of said insert carriers are grouped and are spaced apart a predetermined pitch along the length of said chain conveyor, and wherein said insert transfer means comprises a plurality of insert receiving rods which are disposed in a predetermined pattern corresponding to that of the inserts when they are disposed in said metal mold and means for simultaneously moving said insert receiving rods into cylindrical inserts.

2. The apparatus according to claim 1 wherein said holding means comprises a receiving plate provided with a plurality of semicircular recesses, a movable clamping plate provided with a plurality of semicircular recesses respectively facing corresponding recesses of said receiving plates, and means for moving said clamping plate toward said receiving plate so as to clamp a plurality of cylindrical inserts between corresponding semicircular recesses.

3. Apparatus according to claim 2 wherein said movable clamping plate is provided with a plurality of spring biased pins respectively projecting into said semicircular recesses to engage said cylindrical inserts.

4. The apparatus according to claim 1 wherein said drive means comprises a sprocket wheel for driving said chain conveyor, a driving motor operatively connected to said sprocket wheel through an endless chain, a feed dog which is urged to engage said endless chain, means to reciprocate said dog in a direction parallel to one straight run of said endless chain, means for permitting said feed dog to rotate in one direction but preventing said feed dog from rotating in the opposite direction so that said endless chain is driven only when said feed dog is moved in a given direction, and means for limiting the stroke of said feed dog to a feed pitch of said chain conveyor.

5. The apparatus according to claim 1 which further comprises insert detecting means responsive to the presence or absence of an insert on said insert carrier for reversing the direction of movement of said chain conveyor thereby loading an insert onto an empty insert carrier.

6. The apparatus according to claim 1 wherein said insert mounting means comprises an arm pivotally supported and means for swinging said arm between said insert transfer means and said metal mold.

* * * * *